United States Patent
Ferris

[11] 3,912,301
[45] Oct. 14, 1975

[54] FIFTH WHEEL PLATE ASSEMBLY FOR TRAILER HITCH

[75] Inventor: Ray L. Ferris, Thornton, Ill.

[73] Assignee: Pullman Incorporated, Chicago, Ill.

[22] Filed: June 21, 1974

[21] Appl. No.: 481,715

[52] U.S. Cl. .............................................. 280/434
[51] Int. Cl.² ....................................... B62D 53/12
[58] Field of Search ............................ 280/435, 434

[56] References Cited
UNITED STATES PATENTS

| | | | |
|---|---|---|---|
| 2,072,661 | 3/1937 | Walther et al. | 280/434 |
| 2,387,625 | 10/1945 | Walther et al. | 280/435 X |
| 2,855,221 | 10/1958 | Cochrane | 280/434 |
| 2,861,818 | 11/1958 | Kayler et al. | 280/434 |
| 3,434,736 | 3/1969 | Lindner | 280/435 |

Primary Examiner—Leo Friaglia
Assistant Examiner—R. Schrecengost
Attorney, Agent, or Firm—Richard J. Myers

[57] ABSTRACT

A fifth wheel plate assembly for particular use with a trailer hitch includes a rotatable locking jaw positioned within the top plate of the assembly. The locking jaw is provided with a kingpin receiving opening and also includes a peripheral notch which is adapted to be engaged by a slidable locking plunger for locking the locking jaw in a closed position with the kingpin contained therein. The locking plunger is spring biased and can be moved by means of a lever to a cocked position partially withdrawn from the locking notch of the locking jaw. As the locking jaw is moved to an open position whereby the kingpin may slide from the fifth wheel plate the clocked plunger is automatically released to assume a position wherein it again can engage the locking notch when the kingpin again is placed in an engaged and locked position and the locking jaw is closed.

3 Claims, 7 Drawing Figures

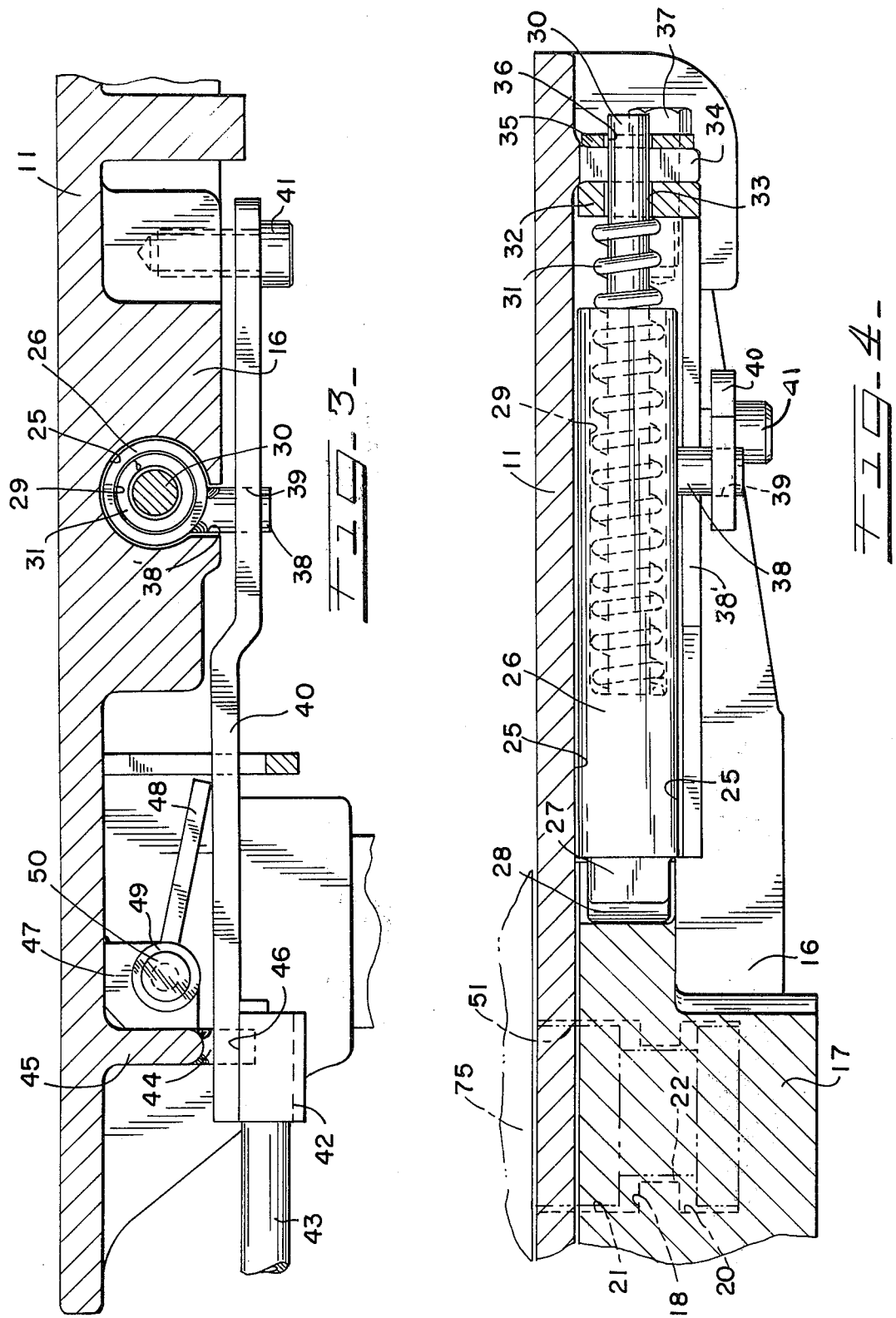

FIFTH WHEEL PLATE ASSEMBLY FOR TRAILER HITCH

A related application is Ser. No. 481,714 filed June 21, 1974, now U.S. Pat. No. 3,892,426 issued July 1, 1975.

BACKGROUND OF THE INVENTION

1. Field of the Invention

This invention concerns the field of fifth wheel plate assemblies which are used for connecting trailers with their kingpins to a trailer hitch or, if desired, to a tractor which may be utilized to draw a trailer. The present fifth wheel plate is particularly adapted for connecting trailers to collapsible trailer hitches normally supported on railway flat cars.

2. Description of the Prior Art

The prior art is exemplified in U.S. Pat. No. 1,981,233 — Nov. 20, 1934; U.S. Pat. No. 2,072,661 — Mar. 2, 1937; U.S. Pat. No. 2,387,625 — Oct. 23, 1945; and U.S. Pat. No. 3,268,250 — Aug. 23, 1966.

SUMMARY OF THE INVENTION

It is an object of the present invention to provide an improved locking arrangement for locking the locking jaw of a fifth wheel plate assembly in a closed position, the assembly includes means whereby a locking plunger is manually placed in a cocked position thus permitting a locking jaw and the kingpin contained therein to move to an open position whereupon the trailer is disconnected from the fifth wheel plate. In the present arrangement as the locking jaw is rotated to said open position a camming edge on the locking jaw engages a camming edge on a locking plunger which again uncocks the locking plunger which is then urged against the outer cylindrical face of the locking jaw during its rotation to the open position. As the locking notch of the locking jaw again registers with the locking plunger and the locking jaw is again moved to its closed position entrapping a kingpin, the locking notch is again fully engaged by the spring pressed locking plunger to again positively insure locking of the kingpin onto the fifth wheel plate.

A novel arrangement also is included to signal the operator that the locking jaw is in a fully locked and engaged position, the same indicating means also providing stop means which will prevent accidental unlocking of the locking plunger relative to the locking notch of the locking jaw.

BRIEF DESCRIPTION OF THE DRAWINGS

FIG. 3 is a cross-sectional view taken substantially along the line 3—3 of FIG. 2;

FIG. 4 is a cross-sectional view taken substantially along the line 4—4 of FIG. 1;

DESCRIPTION OF THE PREFERRED EMBODIMENT

Figure 1:
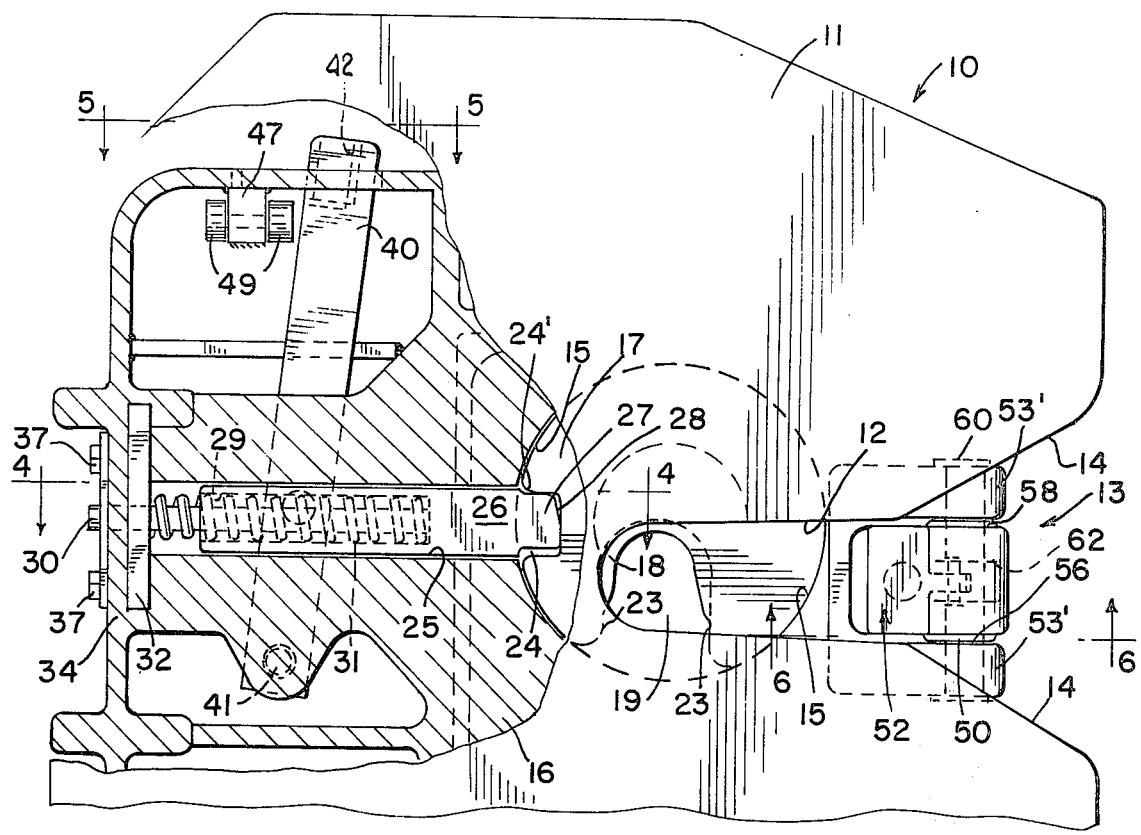
FIG. 1 is a plan view partially in section of a fifth wheel assembly.
Figure 2:
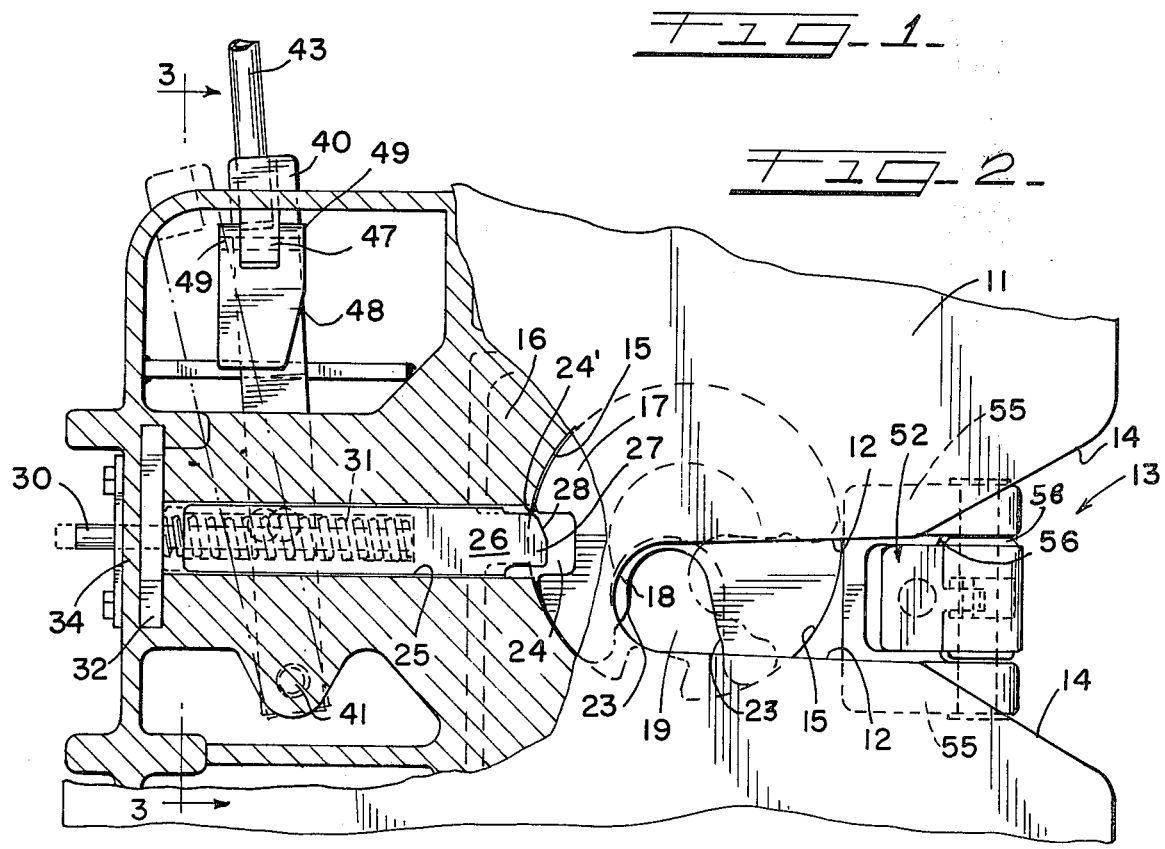
FIG. 2 is a view similar to FIG. 1 showing a stage in the operation of a locking plunger to an open position.
Figure 5:
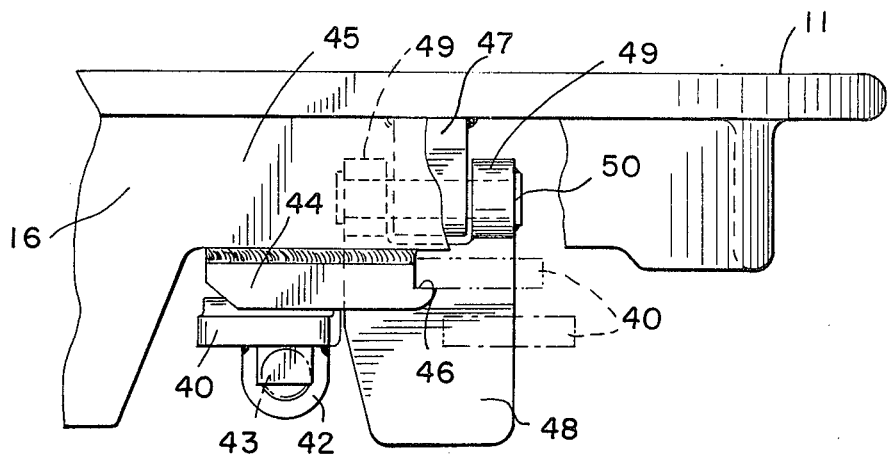
FIG. 5 is a cross-sectional view taken substantially along the line 5—5 of FIG. 1.
Figure 6:
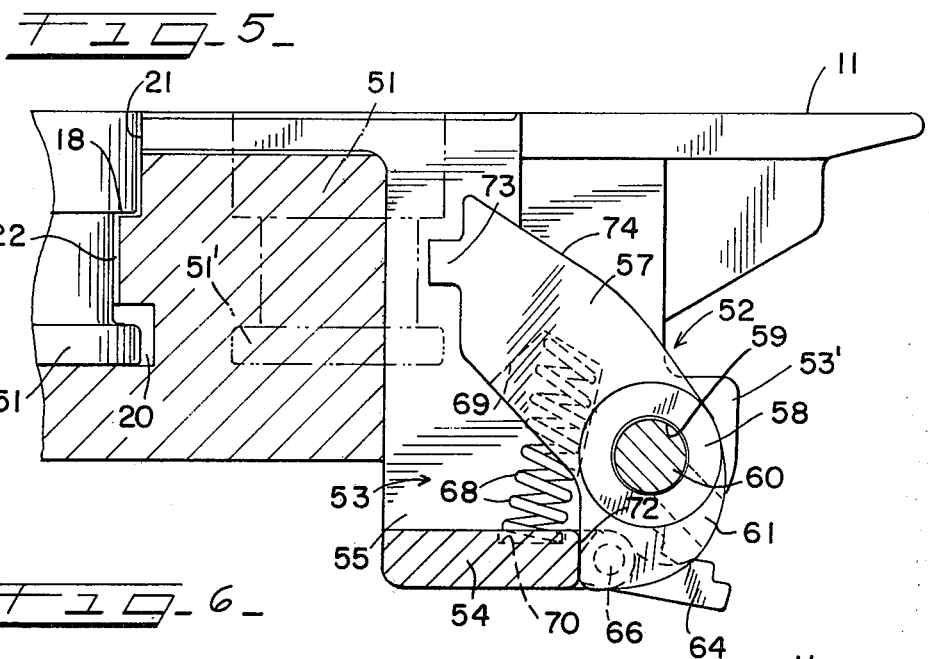
FIG. 6 is a cross-sectional view taken substantially along the line 6—6 of FIG. 1.

Referring to the drawings, a fifth wheel assembly 10 comprises a conventional top plate 11 having at a forward portion thereof an elongated entry slot 12 which communicates with a substantially central gathering aperture 13. The gathering aperture 13 comprises converging sides 14 which lead to a circular opening 15 provided in the top plate. A coupler jaw 17 is rotatably positioned for rotating movement within the circular opening 15. The gathering jaw is provided with a conventional shoulder 18 provided in a semi-cylindrical open end aperture 19 which is adapted to entrap and support a kingpin 51 in locked relation to the top plate 11. The semi-cylindrical opening open end aperture 19 also includes a lower semi-cylindrical socket 20 and an upper cylindrical socket 21 which are spaced apart by means of a reduced diameter semi-cylindrical bore 22, as best shown in FIG. 6. This arrangement is similar to that described in the aforementioned U.S. Pat. No. 3,268,250. The open end aperture 19 is also formed by arcuate irregular sides 23 which serve to expedite the entry of the kingpin into seating arrangement with respect to said semi-cylindrical open end aperture 19. As best shown in FIGS. 1 and 2, the coupler jaw also includes a peripheral locking notch 24 having at one end a curved camming edge 24'. The top plate which includes an integral base 16 extending downwardly from said plate is provided with a plurality of webs and thickened sections which are not described in detail except those which particularly apply to associated structure set forth herein. A thickened portion of the base 16 includes an elongated bore 25 in which a locking plunger 26 is slidingly positioned. The locking plunger 26 is provided at one end with an integral locking cam 27 having a tapered cam face 28, as best shown in FIGS. 1 and 2. The locking cam 27, as shown in FIG. 1, is in locking engagement with the locking notch 24 of the coupler jaw 17. The locking plunger also includes an elongated bore 29 within which a rod 30 is positioned. The rod 30, as best shown in FIG. 4, projects outwardly from one end of the locking plunger 26 and supports a coil spring 31 which is in abutting relation with respect to a backup plate 32 secured to a web 34 projecting downwardly from the top plate 11. The backuup plate 32 is provided with an aperture 33 through which the rod 30 projects and the said rod 30 also projects through the web 34 and through an attachment plate 35 having a bore 36, the said plate 35 being suitably attached to the web 34 and backup plate 32 by means of screws 37. As best shown in FIGS. 3 and 4, the rod 30 has a downwardly extending cylindrical projection 38 which is adapted to slide longitudinally within an open end slot 38' in the base 16. The cylindrical projection 38 extends through an opening 39 in a lever 40 which is pivoted on the base 16 by means of a cap screw 41, as best shown in FIGS. 3 and 4. The end of the level 40 is provided with a socket 42 within which a handle 43 is rigidly positioned, the same being adapted for manual movement by means of an operator. As best shown in FIG. 5, a support bracket 44 is fixedly connected to a web 45 of the top plate 11, the said bracket 44 including a support notch 46.

As best shown in FIGS. 1, 2, 3 and 5, a bracket 47 projects downwardly from the top plate 11 and pivotally supports an indicating flange and stop arrangement generally indicated at 48. The flag and stop arrangement 48 includes spaced fingers 49 supporting a hinge pin 50 which is pivotally supported on the bracket 47.

Figure 7:
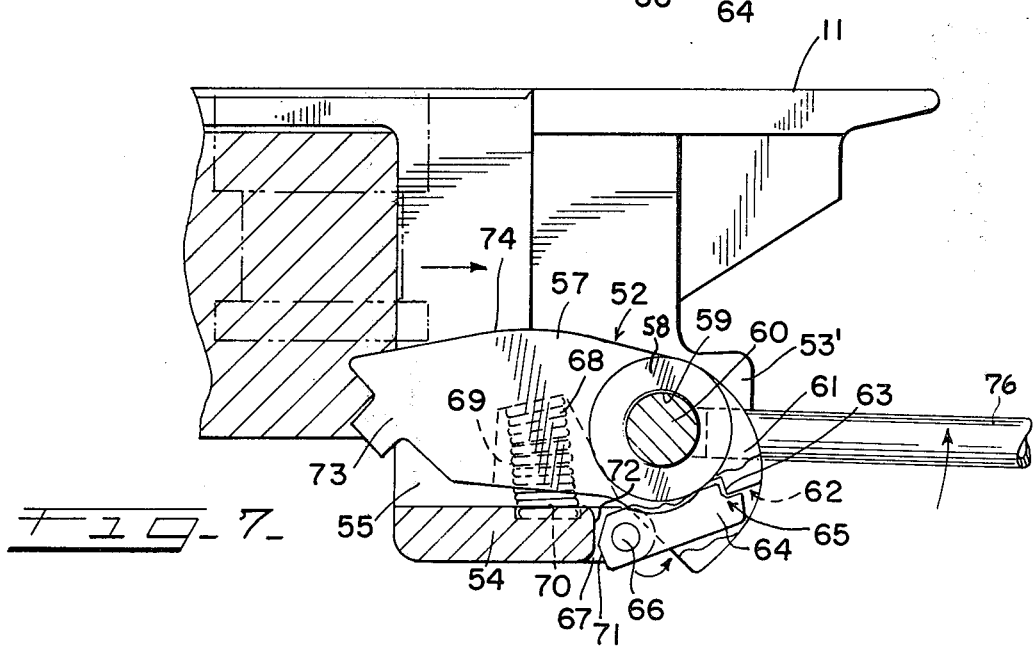
FIG. 7 is a view similar to FIG. 6 showing an operating position of a locking dog.

A conventional kingpin is designated at 51 and is disclosed in FIGS. 4, 6 and 7. The kingpin 51 will be described in more detail in the following description. An auxiliary lock is generally designated at 52 and includes a U-shaped bracket 53 rigidly connected to the underneath side of the top plate 11. The U-shaped bracket is disposed between opposite sides of the elongated entry slot 12 and includes a lower horizontal wall 54 and vertical side walls 55. The lower wall 54 is cut out as indicated at 56 in FIG. 2 to provide a vertically extending edge portion 72. The auxiliary lock includes a hinged dog 57 having laterally spaced integral bearing shoulders 58 and a transverse bore 59. A hinge pin 60 extends through the bore 59 and is firmly supported on apertured finger projections 53'.

The dog 57 includes a foot portion 61 projecting downwardly which is cut out or slotted at 62, FIG. 7, to provide a shoulder arrangement designated at 63. A latch 64 provided with a complemental shoulder arrangement 65 is hingedly connected by means of a hinge pin 66 to a pair of projecting arms 67 extending outwardly on opposite sides of the cutout portion 56 and the vertical face 72.

A cylindrical spring 68 is provided in a socket 69 in the dog 57 and the other end is secured within a recessed spring seat 70 provided in the lower wall 54. The latch 64 is also provided with an end portion 71 which is adapted to engage the vertical edge 72, as best shown in FIG. 6 when the latch 64 is in a non-securing position. The dog 57 also is provided with an upper tapering edge 74, as best shown in FIGS. 6 and 7.

THE OPERATION

In FIG. 4 the broken line portion 75 designates the lower surface of a trailer having the kingpin 51 projecting downwardly therefrom in conventional fashion. In the use of the fifth wheel on a trailer hitch the same is in a stationary position on a railway flat car. The trailer is then maneuvered in a position wherein the kingpin enters the gathering aperture through the converging sides 14 into the gathering aperture 13. The coupler jaw 17 is positioned with the semi-cylindrical open end aperture 19 in registry with the gathering aperture and elongated entry slot 12 to receive the kingpin.

In the position shown in FIG. 1, the coupler jaw 17 is positioned in a closed position since the locking notch 24 is firmly engaged by the locking cam 27 of the locking plunger 26. The kingpin is not shown in FIGS. 1 and 2, the same being shown in the locked position in FIG. 4. In this particular locked position, the lever 40 is in the position shown in FIG. 1, and is nonfunctional except that it cannot be moved from the position shown in FIG. 1 in view of the flag and stop 48 which is pivoted downwardly by gravity and is in the path of movement of the lever 40. This then prevents any possibility of the locking plunger 26 being removed from locking engagement with respect to the coupler jaw 17 as shown in FIG. 1.

Assuming now that the operator wishes to unlock the coupler jaw to remove the kingpin and trailer after the flat car has reached its destination. The operator first manually moves the flag 48 from its in-the-way position of FIG. 1 to an out-of-the-way position substantially horizontally as shown in FIG. 2 so that the operator may now move the lever 40 underneath the flag 48 to manually remove the lock plunger 26 from the locking engagement. As the operator moves the lever 40, the cam 27 is withdrawn against the action of the coil spring 31 to the dotted line position shown in FIG. 2. Manipulation of the trailer now causes the locking jaw to freely rotate from the position shown in FIG. 1 to the position shown in FIG. 2 whereupon the kingpin is free to move outwardly from the entry slot, subject, of course, to release of the auxiliary lock 52 which will be described later. The position of the lever 40 to the dotted line position as shown in FIG. 2 is only momentary to permit the locking jaw to rotate. To keep the lever in a cocked position at this time, the operator immediately shifts the lever 40 upwardly to the position shown in FIG. 5 wherein the lever is held within the support notch 46. At this point then the lever 40 is in the full line position shown in FIG. 2 and the cam face 28 of the locking plunger 26 is still slightly within the socket 24, since at this point the coupler jaw 17 has not rotated. As the coupler jaw now rotates to the opened position shown in the dotted lines of FIG. 2 and the locking notch 24 moves to the open position, the camming edge 24' engages the sloping cam face 28 of the locking cam 27 and moves the locking plunger 26 outwardly completely from the opening 24 which, in turn, causes the lever 40 to move outwardly from the support notch 46 and freely fall by gravity to the dotted line position shown in FIG. 5. The flag 48 still at this point rests upon the upper surface of the lever 40 as shown in FIG. 3. Thus the plunger 26 remains in a cocked position and rides about the outer peripheral surface of the coupler jaw which is moving to the open position to discharge the kingpin. Upon re-entry of a kingpin into the coupler jaw, the same is again rotated to the closed position shown in FIGS. 1 and 2. The locking plunger is biased toward the locking jaw with the cam face 28 ready to engage the notch 24 when in registry therewith. Upon such engagement the lever 40 is again placed in the position shown in FIG. 1. The flag and stop 48 now is returned by gravity to its locked position as shown in FIG. 1 which is in the path of movement of the lever 40. Thus complete automatic locking is assured since the plunger 26 is in a cocked position immediately after the locking notch 24 is placed out of alignment with the end of the locking plunger 26.

In the operation the auxiliary lock 57 is effective to provide a secondary means preventing the kingpin from moving out of the elongated entry slot 12. In the position shown in FIG. 6, the dog 57 blocks the movement of the kingpin from the dotted line position shown even though the kingpin 51 might have been released from the open end aperture 19 of the coupler jaw. Thus in this position the necessary movement out of the elongated slot 12 and gathering aperture 13 is prevented, the dog 57 being in the path of movement of the kingpin. The projecting boss 73 also is disposed inwardly with respect to the spool shaped cylindrical portions 51' of the kingpin 51, as shown in broken lines in FIG. 6, so that any upward movement of the kingpin is limited. In the position shown in FIG. 6 the hinged dog 57 is in the upright position being urged to maintain the said position by virtue of the spring 68. In this position the foot portion 61 is in abutting relation with respect to the vertical edge 72 of the lower wall 54. As best shown in FIG. 6, the latch element 64 is also in its release position with its rear edge 71 engaging the wall 72. In order to fully release the kingpin 51 from its engagement with the top plate it is necessary to manually depress the dog 57 to the position shown in FIG. 7. In this position the spring 68 is compressed. The latch 64 has been manually rotated in a counterclockwise direction to and in engagement with the foot portion 61 with the shoulders 63 and 65 in interengagement whereby the dog is held in the lowered position against the action of the spring 68. In order to move the dog 57 to this position a rod 76 is inserted in a suitable aperture in the foot portion 61 to facilitate handling by the operator. Thus the kingpin 51 as shown in FIG. 7 is now free to move in the direction of the arrow outwardly from the top plate. As it moves in this direction the lowermost end of the cylindrical spool shaped enlargement 51' engages the tapered edge or surface 74 of the hinge dog 57 and rotates the same slightly in the counterclockwise direction whereupon the latch 64 is now free to fall downwardly by gravity to the position shown in FIG. 6 whereupon the dog 57 again assumes its locking position.

When a kingpin 51 again enters into the gathering aperture 32 and travels through the entry slot 12 it engages the surface 74 to lower or pivot the dog in the counterclockwise direction so that the kingpin is free to pass to the position within the coupler jaw. After the kingpin has traveled by the dog, it is again raised by means of the spring 68 to the position shown in FIG. 6 which is the auxiliary locking position.

What is claimed is:

1. A fifth wheel plate assembly for connection with the kingpin of a trailer, said assembly comprising a plate having a substantially circular opening in said plate and an entry slot communicating with said circular opening, a coupler jaw supported for turning movement within said circular opening, said coupler jaw including an open end slot normally disposed to be engaged by a kingpin when the kingpin is moving through said entry slot and in alignment with said open end slot in a manner to cause turning movement of said jaw to close said open end slot with the kingpin retained therein, locking notch means formed on the coupler jaw, a locking plunger mounted on said plate for lengthwise movement into and out of engagement with said locking notch means when the latter is aligned therewith and the open end slot is in said closed position, resilient means biasing said locking plunger into engagement with said locking notch means, the improvement comprising:

locking and actuating means for retracting said locking plunger from seating engagement with said locking notch means including, an actuating arm connected to said plate and to said locking plunger for manual movement, whereby during said manual movement said locking plunger is in a partially retracted position with respect to said locking notch means against said biasing means, catch means on said plate for engaging said arm in said partially retracted position, said locking notch means including means engageable with said locking plunger during rotation of said jaw to a position wherein said slots are in alignment to completely retract said plunger from said locking notch means and thereby disengaging the same from said catch means; whereupon realignment of said locking notch means with said plunger, said biasing means again urges said plunger in engagement therewith;

said catch means having a stop member including disengageable latch and indicating means disposed in one position in the path of horizontal planar movement of said arm when said locking plunger is in seating engagement with said locking notch means, said latch and indicating means including a flap hingedly supported on said plate and in said one position being disposed vertically indicating a locked position of said plunger, said flap being manually hingedly movable from said one position to a substantially horizontal position to permit the path of horizontal planar movement of said arm for moving said plunger to said partially retracted position, said stop member being connected to the underneath side of said plate, said arm being shiftable vertically into engagement with said stop member during said partially retracted position of said plunger, said catch means including a ledge supporting said arm during engagement of said plunger with said locking notch means when said plunger is in the partially retracted position, and means on said locking notch means to completely retract said plunger including first camming means engageable with second camming means on said plunger to move the latter to said completely retracted position whereupon said arm is disengaged from said ledge and drops by gravity from said ledge; and said plunger is biased against said coupler jaw.

2. The invention in accordance with claim 1, said first camming means including a cam surface formed in said locking means, and said second camming means including an inclined cam face on said plunger.

3. A fifth wheel plate assembly for connection with the kingpin of a trailer, said assembly comprising a plate having a substantially circular opening in said plate and an entry slot communicating with said circular opening, a coupler jaw supported for turning movement within said circular opening, said coupler jaw including an open end slot normally disposed to be engaged by a kingpin when the kingpin is moved through said entry slot in alignment with said open end slot in a manner to cause turning movement of said jaw to close said open end slot with the kingpin retained therein, locking notch means formed on the coupler jaw, a locking plunger mounted on said plate for lengthwise movement into and out of engagement with said locking notch means when the latter is aligned therewith and the open end slot is in said closed position, resilient means biasing said locking plunger into engagement with said locking notch means, the improvement comprising locking and actuating means for retracting said locking plunger from seating engagement with said locking notch means including, an actuating arm connected to said plate and to said locking plunger for manual movement, whereby during said manual movement said locking plunger is in a partially retracted position with respect to said locking notch means against said biasing means, catch means on said plate for engaging said arm in said partially retracted position, said locking notch means including means engageable with said locking plunger during rotation of said jaw to a position wherein the slots are in alignment to completely retract said plunger from said locking notch means and thereby disengaging the same from said catch means; whereupon realignment of said locking notch means with said plunger, said biasing means again urges said plunger in engagement therewith;

said catch means including a stop member connected to the underneath side of said plate, said actuating arm being movable in a horizontal plane during retraction of said plunger, said arm being shiftable vertically into engagement with said stop member during said partially retracted position of said plunger, said stop member including a ledge supporting said arm during engagement of said arm with said ledge when said arm is in said partially retracted position, means on said locking notch means to completely retract said plunger including first camming means engageable with second camming means on said plunger to move the latter to said completely retracted position whereupon said arm is disengaged from said ledge and drops by gravity from said ledge; and said plunger is biased against said coupler jaw, said first camming means including a cam surface formed in said locking notch means, and said second camming means including an inclined cam face on said plunger, said arm being shiftable in a horizontal plane below said plate about a vertical pivot axis, and said arm being connected to said pivot axis to provide for limited vertical movement at one end of said arm.

* * * * *